United States Patent [19]

Funahashi et al.

[11] Patent Number: 5,046,147
[45] Date of Patent: Sep. 3, 1991

[54] RADIATION IMAGE PROCESSING METHOD

[75] Inventors: Takeshi Funahashi; Kazuo Shimura; Nobuyoshi Nakajima, all of Kanagawa, Japan

[73] Assignee: Fuji Photo Film Co., Ltd., Kanagawa, Japan

[21] Appl. No.: 422,483

[22] Filed: Oct. 17, 1989

[30] Foreign Application Priority Data

Oct. 17, 1988 [JP] Japan ................. 63-261174
Oct. 17, 1988 [JP] Japan ................. 63-261175

[51] Int. Cl.$^5$ ............................. G01N 23/04
[52] U.S. Cl. ....................... 250/327.2; 250/484.1
[58] Field of Search .............. 250/327.2 C, 327.2 G, 250/484.1, 337; 382/6, 54; 364/413.13

[56] References Cited

U.S. PATENT DOCUMENTS

| | | |
|---|---|---|
| 4,258,264 | 3/1981 | Kotera et al. |
| 4,276,473 | 6/1981 | Kato et al. |
| 4,315,318 | 2/1982 | Kato et al. |
| 4,387,428 | 6/1983 | Ishida et al. |
| 4,394,737 | 7/1988 | Komaki et al. |
| 4,527,060 | 7/1985 | Suzuki et al. |
| 4,864,134 | 9/1989 | Hosoi et al. |
| 4,920,267 | 4/1990 | Nagata et al. |

FOREIGN PATENT DOCUMENTS 56-11395 5/1981 Japan .
0173540 9/1985 Japan ................. 250/327.2

Primary Examiner—Jack I. Berman
Assistant Examiner—Richard Hanig
Attorney, Agent, or Firm—Sughrue, Mion, Zinn, Macpeak & Seas

[57] ABSTRACT

A radiation image is processed in a radiation image read-out and reproducing system wherein a read-out operation is carried out in which a stimulable phosphor sheet having a radiation image stored thereon is exposed to stimulating rays, which cause the stimulable phosphor sheet to emit light in proportion to the amount of energy stored thereon during exposure to radiation, and wherein the emitted light is photoelectrically detected and a read-out image signal which represent the radiation image is thereby obtained, said read-out image signal being used to reproduce the radiation image as a visible image. A radiation image processing method comprises the steps of calculating characteristic values, which serve as tools in the extraction of only those image signal components related to a diagnosis, or the like, from the read-out image signal, and carrying out transformation processing on the read-out image signal, the exact nature of the transformation depending on the characteristic values. A read-out gain and/or a scale factor is corrected with the transformation processing. The signal obtained after the transforming processing is carried out on the read-out image signal is used to reproduce the radiation image as a visible image.

9 Claims, 3 Drawing Sheets

RADIATION IMAGE PROCESSING METHOD

BACKGROUND OF THE INVENTION

1. Field of the Invention

This invention relates to a radiation image processing method, wherein a visible image which can be used for diagnostic purposes is produced from a read-out image signal. The read-out image signal is obtained from a read-out operation and is subjected to transformation processing. In the read-out operation, a stimulable phosphor sheet having a radiation image stored thereon is exposed to stimulating rays, which cause the stimulable phosphor sheet to emit light in proportion to the amount of energy stored thereon when it was exposed to radiation. The emitted light is photoelectrically detected, and thereby the read-out image signal is obtained.

2. Description of the Prior Art

When certain kinds of phosphors are exposed to radiation such as X-rays, α-rays, β-rays, γ-rays, cathode rays, or ultraviolet rays, they store part of the energy of the radiation. Then, when a phosphor, which has been exposed to the radiation, is exposed to stimulating rays such as visible light, it emits light in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation, which has passed through an object such as a human body, in order to cause a radiation image of the object to be stored thereon, and is then scanned with stimulating rays, such as a laser beam, which cause it to emit light in proportion to the amount of energy stored thereon during its exposure to the radiation. The light emitted by the stimulable phosphor sheet upon stimulation thereof is photoelectrically detected and converted into an electric image signal with a photomultiplier or the like, and the image signal is used to reproduce the radiation image of the object as a visible image on a recording material such as photographic film, on a display device such as a cathode ray tube (CRT), or the like.

In the aforesaid radiation image recording and reproducing systems, in order to eliminate various problems caused by variations in the input information and/or to obtain a radiation image, which has good image quality and can serve as an effective tool in, for example, the efficient and accurate diagnosis of an illness, it is desirable to ascertain the characteristics of the image input information before the radiation image is reproduced as a visible image so that the read-out gain can be adjusted to an appropriate value. The characteristics of the image input information depend on the conditions under which an image is recorded, such as the level of the radiation dose used when the image is recorded, on the image input pattern which is determined by what portion of an object (e.g. the chest or the abdomen of a human body) is recorded, and on the image recording method used, such as plain image recording or contrasted image recording. The process of determining the characteristics of the image input information will hereinafter simply be referred to as "ascertaining the image input information." It is also desirable to adjust the scale factor in accordance with the contrast in the image input pattern in order to optimize the resolution of the reproduced visible image. Also, in cases where image processing, such as gradation processing, is carried out on the read-out image signal, it is desirable that the conditions under which the image is processed be adjusted in accordance with the characteristics of the image input information.

The method as disclosed in U.S. Pat. No. 4,527,060 may be used to ascertain the image input information before the visible image is reproduced. In the disclosed method, a preliminary read-out operation (hereinafter referred to as the "preliminary readout") is carried out to ascertain the image input information of a radiation image stored on a stimulable phosphor sheet. A visible image which can be used for diagnostic purposes is obtained from a final read-out operation (hereinafter referred to as the "final readout"). During the preliminary readout, stimulating rays are used which have an energy level lower than the energy level of the stimulating rays used in the final readout. After the preliminary readout is completed, the final readout is carried out.

However, in cases where the preliminary readout is carried out, the processing of the preliminary readout signal obtained therefrom takes a long time.

SUMMARY OF THE INVENTION

The primary object of the present invention is to provide a radiation image processing method in which a preliminary readout need not be carried out but with which a visible radiation image having such good image quality can be reproduced that the visible image is effective as a tool in the accurate and efficient diagnosis of an illness.

Another object of the present invention is to provide a radiation image processing method wherein transformation processing is carried out efficiently on a read-out image signal, which is obtained from a radiation image read-out operation, in order that a visible radiation image having good image quality can be reproduced and used, in particular, as an effective tool in the accurate and efficient diagnosis of an illness.

The present invention provides a first radiation image processing method wherein from a read-out image signal obtained from a radiation image read-out operation corresponding to the aforesaid final readout) a visible image is reproduced which can be used, in particular, for diagnostic purposes, the read-out image signal being subjected to transformation processing before the visible image is reproduced therefrom.

Specifically, the present invention provides a first radiation image processing method for use in a radiation image read-out and reproducing system wherein a read-out operation is carried out in which a stimulable phosphor sheet having a radiation image stored thereon is exposed to stimulating rays, which cause the stimulable phosphor sheet to emit light in proportion to the amount of energy stored thereon during exposure to radiation, and wherein the emitted light is photoelectrically detected and a read-out image signal which represents the radiation image is thereby obtained, said read-out image signal being made up of a series of components and being used to reproduce the radiation image as a visible image, the radiation image processing method comprising the steps of:

i) calculating characteristic values, which serve as tools in extracting only those image signal components which are relevant to a specific diagnosis or the like from said read-out image signal, ii) carrying out image signal normalizing transformation processing on said read-out image signal, the exact nature of the transformation depending on said characteristic values, in order to correct a read-out gain and/or a scale factor, and iii) using the signal, which results after said image signal normalizing transformation processing is carried out on said read-out image signal, in order to reproduce the radiation image as a visible image.

With the first radiation image processing method in accordance with the present invention, the read-out gain which is used during the read out operation is set to an appropriate value. However, when the read-out image signal obtained from the read-out operation is studied, it is possible to ascertain what level of read-out gain should have been used during the read-out operation in order to ensure that a visible image having the best possible image quality is obtained; i.e. it is possible to ascertain the optimum read-out gain. After the optimum read-out gain is ascertained, the read-out image signal which has been obtained from the read-out operation is transformed, the transformation depending on the value of the ascertained optimum read-out gain. The transformation results in the image signal which would have been obtained if the optimum read-out gain had been used in the read-out operation. Consequently, it is possible to obtain an image signal which is equivalent to the read-out image signal which would have been obtained from a read-out operation in which the optimum read-out gain had been used.

By way of example, the optimum read-out gain Sk may be set so that the mean value mean of the range in the values of a read-out image signal, which is to be reproduced, corresponds to the mean value of a predetermined image signal range, Qmin to Qmax, which is fed into an image reproducing apparatus. The optimum read-out gain Sk is calculated as a function of the mean value Smean. In such cases, the optimum read-out gain Sk is equal to the input signal level which corresponds to the center value, Qcenter, of the output image signal range (the center value, Qcenter, is 511 in cases where the level of the output image signal ranges from 0 to 1023). For example, in cases where the probability density function of the read-out image signal is indicated by Curve A in FIG. 3, the mean value of the read-out image signal range Smin to Smax is equal to Smean, and the read-out image signal range Smin to Smax should be transformed so as to have an image signal range Qmin to Qmax. The transformation is effected with a scale factor Gp (which is the slope of the straight line in FIG. 3, i.e. the slope of the transformation straight line H), and the probability density function of the image signal resulting from the transformation is indicated by Curve A' in FIG. 3. The scale factor Gp may be calculated from, for example, the formula $$Gp = \frac{Qmax - Qmin}{Smax - Smin}$$

The scale factor Gp determines the latitude of a reproduced visible image. In cases where a preliminary readout is carried out, the scale factor Gp has heretofore been set on the basis of image input information ascertained from an image signal obtained from the preliminary readout. During the final readout, the read-out image signal has heretofore been transformed in accordance with the scale factor Gp. However, in cases where transformation processing is carried out to correct the read-out gain as described above, transformation processing to determine the latitude can be and should preferably be carried out simultaneously. Basically, the characteristic value Gp which is used in transformation processing for the determination of the latitude, and the characteristic value Sk, which is used when transformation processing to correct the read-out gain is carried out, can be calculated when the minimum value Smin and the maximum value Smin of the image signal range are known, the image signal being used to reproduce a visible image. Therefore, in order to calculate the characteristic values Sk and Gp, the minimum value Smin and the maximum value Smin of the read-out image signal may be found, the read-out image signal being obtained from a read-out operation wherein, for example, the emitted light detection level is adjusted so that it is very wide. After the characteristic values Sk and Gp are calculated, they are used to carry out transformation processing expressed by, for example, the formula $$Q = Gp \cdot (S - Sk) + Qcenter \qquad (1)$$

where Qcenter denotes the center value of the output image signal range (the center value Qcenter is 511 in cases where the level of the output image signal ranges from 0 to 1023). In this manner, transformation processing for the correction of the read-out gain and transformation processing for the determination of the latitude can be carried out simultaneously.

As shown in FIG. 4, when the transformation processing expressed by Formula (1) is carried out, the read-out image signal range Smin to Smax is converted into an image signal range Qmin to Qmax having values lying on a transformation straight line H'. In FIG. 4, transformation processing is carried out on the basis of a single transformation straight line H', i.e. on the basis of a single simple equation, over the whole range of Smin to Smax. However, it often occurs that the components of the image signal having relatively low or high densities saturate during transformation processing, depending on the relationship between the image signal range Qmin to Qmax, which is fed into an image reproducing apparatus, and the read-out image signal range Smin to Smax. For example, in cases where the read-out image signal ranges from Smin' to Smax' as shown in FIG. 4, all of the low density image signal components falling within the range of Smin' to Smin are transformed into the signal value Qmin, and all of the high density image signal components falling within the range of Smax to Smax' are transformed into the signal value Qmax. As a result, image information related to a diagnosis or the like is often lost from the reproduced visible image. In order to eliminate such problems, as shown in FIG. 5, transformation processing should be carried out on the basis of several transformation straight lines (H1', H2', and H3' in FIG. 5), i.e. on the basis of several simple equations, which are applied to different parts of the read-out image signal range Smin to Smax. Alternatively, as shown in FIG. 6, transformation processing may be carried out on the basis of a transformation curve Ha. In cases where transformation processing is carried out on the basis of the transformation straight lines H1', H2', and H3' as shown in FIG. 5, divisions α, β, and γ, to which the transformation straight lines H1', H2', and H3' are applied, may be arranged in such a manner that, for example, the division u ranges over a certain percentage of the read-out image signal range Smin to Smax starting from the minimum value Smin, and the division γ ranges over a certain percentage of the read-out image signal range Smin to Smax starting from the maximum value Smax. The divisions α, β, and γ may be changed in accordance with, for example, what portion of an object was recorded as the radiation image.

As described above, with the first radiation image processing method in accordance with the present invention, characteristic values which serve as tools in the extraction of only those image signal components related to a diagnosis, or the like, are calculated from the read-out image signal. Image signal normalizing transformation processing of the read-out image signal is carried out on the basis of the characteristic values in order to correct the read-out gain and/or the scale factor. The signal, which is obtained after the image signal normalizing transformation processing has been carried out, is used in order to reproduce the radiation image as a visible image. Therefore, a visible image, which has good image quality and can serve as an effective tool in, for example, the efficient and accurate diagnosis of an illness, can be reproduced quickly without a preliminary readout being carried out.

The present invention also provides a second radiation image processing method for use in a radiation image read-out and reproducing system wherein a read-out operation is carried out in which a stimulable phosphor sheet having a radiation image stored thereon is exposed to stimulating rays, which cause the stimulable phosphor sheet to emit light in proportion to the amount of energy stored thereon during exposure to radiation, and wherein the emitted light is photoelectrically detected and a analog read-out image signal which represents the radiation image is thereby obtained, the read-out image signal obtained from the read-out operation thereafter being used to reproduce the radiation image as a visible image, the radiation image processing method comprising the steps of:

i) digitizing said read-out image signal so that said read-out image signal is made up of a series of components, ii) calculating characteristic values, which serve as tools in the extraction of only those image signal components which are related to a diagnosis or the like, from the digital image signal, iii) creating a table, which is to be used when said digital image signal undergoes transformation processing, values in said table being based on said characteristic values, iv) carrying out transformation processing on said digital image signal in accordance with said table, and v) using the signal, which is obtained after said transformation processing has been carried out on said digital image signal, in order to reproduce the radiation image as a visible image.

With the second radiation image processing method in accordance with the present invention, the read-out image signal is digitized, and characteristic values which serve as tools in the extraction of only those image signal components related to a diagnosis, or the like, are calculated from the digital image signal. A table, which is to be used when transformation processing is carried out on the digital image signal, is created on the basis of the characteristic values, and transformation processing is carried out on the digital image signal in accordance with the table. Therefore, transformation processing can be carried out efficiently, and a visible radiation image can be reproduced a short time after the radiation image has been read out.

DESCRIPTION OF THE PREFERRED EMBODIMENTS

The present invention will hereinbelow be described in further detail with reference to the accompanying drawings.

Figure 1:
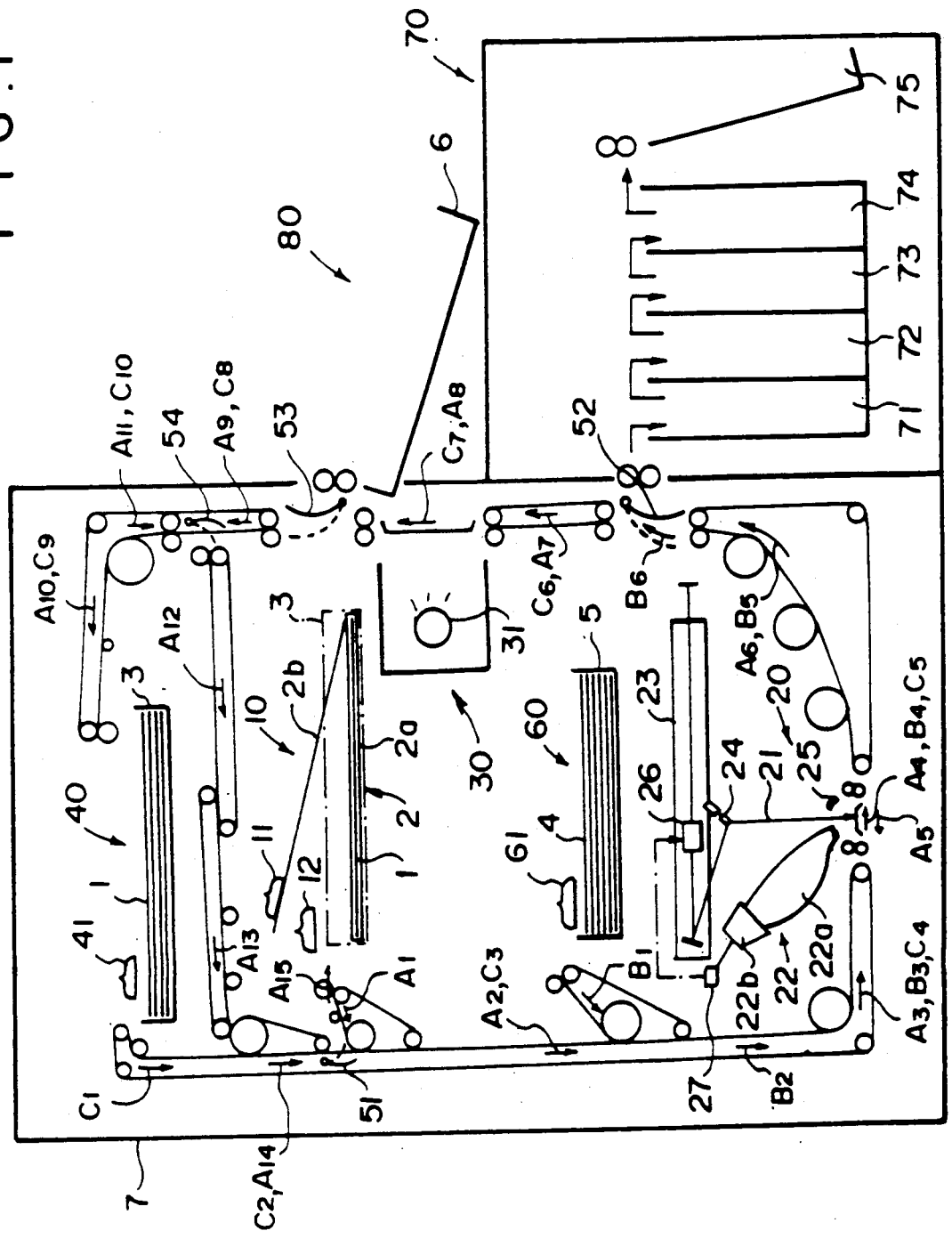
FIG. 1 is a schematic side view showing an example of a radiation image read-out and reproducing apparatus wherein an embodiment of the radiation image processing method in accordance with the present invention is employed.

FIG. 1 shows an example of a radiation image read-out and reproducing apparatus wherein a radiation image is read out from a stimulable phosphor sheet in order to obtain a read-out image signal, the read-out image signal is transformed with an embodiment of the radiation image processing method in accordance with the present invention, and the transformed image signal is used to reproduce the radiation image as a visible image. By way of example, in the radiation image read-out and reproducing apparatus, readout and reproduction of the radiation image are carried out with a single stage.

With reference to FIG. 1, the radiation image read-out and reproducing apparatus is provided with a cassette holding section 10, which releasably holds a cassette 2 capable of housing a stimulable phosphor sheet 1 therein, and a magazine holding section 40, which releasably holds a stimulable phosphor sheet magazine 3 capable of housing a plurality of stimulable phosphor sheets 1, 1, ... therein. The radiation image read-out and reproducing apparatus is also provided with a recording sheet feeding section 60, which releasably holds a recording sheet feeding magazine 5 capable of housing a plurality of recording sheets 4, 4, ... therein, a light beam scanning section 20 in which a radiation image stored on a stimulable phosphor sheet 1 is read out and reproduced on a recording sheet 4, and an erasing section 30 in which any energy remaining on the stimulable phosphor sheet 1 after the radiation image has been read out therefrom in the light beam scanning section 20 is erased. The radiation image read-out and reproducing apparatus is further provided with an automatic developing section 70, which carries out development of the recording sheet 4 on which the radiation image has been reproduced in the light beam scanning section 20, and a tray holding section 80, which releasably holds a tray 6 capable of housing a plurality of the stimulable phosphor sheets 1, 1, ... therein. Also, the radiation image read-out and reproducing apparatus is provided with a first stimulable phosphor sheet conveyance means for receiving a stimulable phosphor sheet 1 fed out of the cassette holding section 10, conveying the stimulable phosphor sheet 1 to the light beam scanning section 20 and the erasing section 30 in this order and then conveying the stimulable phosphor sheet 1 to the cassette holding section 10, and a second stimulable phosphor sheet conveyance means for receiving a stimulable phosphor sheet 1 fed out of the magazine holding section 40 and conveying the stimulable phosphor sheet 1 to the light beam scanning section 20, the erasing section 30 and the tray holding section 80 in this order. Furthermore, a recording sheet conveyance means receives a recording sheet 4, which is fed out of the recording sheet feeding section 60, and conveys the recording sheet 4 to the light beam scanning section 20 and the automatic developing section 70 in this order. Most parts of these three conveyance means are common to one another, and the three conveyance means are generically referred to as a sheet conveyance means 50.

The stimulable phosphor sheet 1 is housed in the cassette 2 and is subjected to image recording in an external image recording apparatus (not shown) in that form. The cassette 2, which houses the stimulable phosphor sheet 1 having a radiation image stored thereon, is then fed to the cassette holding section 10. The cassette 2 is sealed against light, which prevents the stimulable phosphor sheet 1 from being exposed to external light when it is housed therein. The cassette 2 comprises a cassette body 2a in which the stimulable phosphor sheet 1 is to be housed and a cover member 2b which can be opened. When the cassette 2 is fed into the cassette holding section 10, the cover member 2b is kept in the closed position. When the stimulable phosphor sheet 1 is to be taken out of the cassette 2 in the cassette holding section 610, a cover opening means 11, which may be constituted of an air suction cup or the like, opens the cover member 2b as illustrated. After the cover member 2b is opened, a stimulable phosphor sheet take-out means 12, which may be constituted of an air suction cup or the like, advances into the cassette 2, sucks the stimulable phosphor sheet 1 out of the cassette 2, and feeds it to the part of the sheet conveyance means 50 which is present in the vicinity of the cassette holding section 10. The stimulable phosphor sheet 1 is held in the cassette 2 with its front surface, which is provided with the stimulable phosphor layer, facing down.

The stimulable phosphor sheet 1, which has been taken out of the cassette 2 in this manner, is conveyed by the sheet conveyance means 50 in the direction indicated by the arrow A1. A distribution means 51, which can move between the position indicated by the solid line and the position indicated by the broken line in FIG. 1, is provided in the sheet conveyance means 50. When the stimulable phosphor sheet 1 is fed out of the cassette 2, the distribution means 51 is located at the position indicated by the solid line, which allows the stimulable phosphor sheet 1 to be conveyed toward the light beam scanning section 20. The stimulable phosphor sheet 1 is further conveyed in the directions indicated by the arrows A2 and A3 into the light beam scanning section 20.

In cases where the stimulable phosphor sheet 1 has thus been conveyed into the light beam scanning section 20, the light beam scanning section 20 scans the stimulable phosphor sheet 1 having a radiation image stored thereon with a laser beam 21, which acts as the stimulating rays and causes the stimulable phosphor sheet 1 to emit light in proportion to the amount of energy stored thereon during its exposure to radiation. Also, the light beam scanning section 20 photoelectrically detects the emitted light with a photoelectric read-out means 22, which is constituted of a photomultiplier or the like, and thereby an electric image signal, which is to be used in the reproduction of a visible image, is obtained. Reference numeral 23 denotes a laser beam source such as an He-Ne laser, and reference numeral 24 denotes a light deflector such as a galvanometer mirror. Reference numeral 25 denotes a reflection mirror which reflects the light emitted by the stimulable phosphor sheet 1 towards a light guide member 22a of the photoelectric read-out means 22. The light guide member 22a guides the light through repeated total reflection thereof until it reaches a photodetector 22b constituted of a photomultiplier or the like. Reference numeral 26 denotes a light modulator such as an acousto-optic modulator (AOM), which is not activated when the laser beam 21 scans the stimulable phosphor sheet 1.

The stimulable phosphor sheet 1, which was sent to the light beam scanning section 20, is conveyed by the sheet conveyance means 50 in the direction indicated by the arrow A4 and is simultaneously scanned with the laser beam 21, which is deflected in a direction approximately normal to the direction of conveyance indicated by the arrow A4. As a result, the overall surface of the stimulable phosphor sheet 1 is two-dimensionally scanned with the laser beam 21 which causes the stimulable phosphor sheet 1 to emit light in proportion to the amount of energy stored thereon during its exposure to radiation. The light emitted by the stimulable phosphor sheet 1 is detected by the photodetector 22b via the light guide member 22a. The photodetector 22b converts the detected light into an electric signal (a read-out image signal), which is then sent to an image information processing circuit 27, where amplification processing and image processing (which will be described later) are carried out on the electric signal.

The optical elements in the light beam scanning section 20 are not limited to those described above. For example, as disclosed in U.S. Pat. Appln. Ser. No. 141,259, a long photomultiplier having an elongated light receiving face may be located in such a way that the elongated light receiving face extends along the main scanning line and detects the light emitted by the stimulable phosphor sheet 1.

In this embodiment, no preliminary readout is carried out, and therefore the light detection range of the photodetector 22b is set to a substantially wide range (for example, approximately 4 orders of ten) during the read-out operation.

After the image readout from the stimulable phosphor sheet 1 is finished in the light beam scanning section 20, the stimulable phosphor sheet 1 is conveyed by the sheet conveyance means 50 in the directions indicated by the arrows A6 and A7. A distribution means 52 is disposed between the light beam scanning section 20 and the erasing section 30. When the stimulable phosphor sheet 1 is thus conveyed, the distribution means 52 is located at the position indicated by the solid line in FIG. 1 and guides the stimulable phosphor sheet 1 to the erasing section 30.

In the erasing section 30, any energy remaining on the stimulable phosphor sheet 1 after the radiation image has been read out therefrom is erased. Specifically, part of the energy stored on the stimulable phosphor sheet 1 during the recording of an image remains stored thereon after the image has been read out therefrom. The residual energy is erased in the erasing section 30 so that the stimulable phosphor sheet 1 may be reused. In the illustrated radiation image read-out and reproducing apparatus, the erasing section 30 is provided with a plurality of erasing light sources 31, 31, ... constituted of fluorescent lamps, tungsten-filament lamps, sodium lamps, xenon lamps, iodine lamps or the like. The stimulable phosphor sheet 1 is exposed to the erasing light produced by the erasing light sources 31, 31, ... in order to cause it to release the residual energy as it is conveyed in the direction indicated by the arrow A8. In the erasing section 30, any known erasing method may be used. For example, erasing may be accomplished by heating the stimulable phosphor sheet 1 or by exposing it to erasing light while heating it.

After the stimulable phosphor sheet 1 is erased in the erasing section 30, it is guided by distribution means 53 and 54, which have been previously located at the positions indicated by the solid lines, and is conveyed in the directions indicated by the arrows A9 and A10. Then, the stimulable phosphor sheet 1 is conveyed in the opposite direction indicated by the arrow A11. Before the stimulable phosphor sheet 1 is thus conveyed in the opposite direction, the distribution means 54 is moved to the position indicated by the broken line. The stimulable phosphor sheet 1 is guided by the distribution means 54 and conveyed by the sheet conveyance means 50 in the directions indicated by the arrows A12, A13 and A14 into the cassette holding section 10. Before the stimulable phosphor sheet 1 is thus conveyed into the cassette holding section 10, the distribution means 51 is moved to the position indicated by the broken line. The stimulable phosphor sheet 1 is guided by the distribution means 51 and conveyed in the direction indicated by the arrow A15 into the empty cassette 2 at the cassette holding section 10. The erased reusable stimulable phosphor sheet 1 is housed in the cassette 2 when it is taken out of the apparatus. It is then sent to an external image recording apparatus for reuse in image recording.

On the other hand, after the stimulable phosphor sheet 1, which was removed from the cassette 2, is conveyed out of the light beam scanning section 20, a suction means 61 takes a single recording sheet 4 out of the recording sheet feeding magazine 5 in the recording sheet feeding section 60 and feeds it to the part of the sheet conveyance means 50 close to the recording sheet feeding section 60. The sheet conveyance means 50 receives the recording sheet 3 and conveys it in the directions indicated by the arrows B1, B2 and B3 to the light beam scanning section 20. The radiation image, which was read from the stimulable phosphor sheet 1 in the manner described above, is reproduced on the recording sheet 4 while the recording sheet 4 is being conveyed in the direction indicated by the arrow B4 in the light beam scanning section 20.

Specifically, in cases where the recording sheet 4 is thus conveyed in the light beam scanning section 20, the light modulator 26 is operated in accordance with the image signal which is generated by the image information processing circuit 27, and the photodetector 22b is turned off. (The image signal corresponds to the read-out image signal which was obtained from the aforesaid read-out operation.) The recording sheet 4 is scanned with the laser beam 21, now acting as the recording light modulated by the light modulator 26 and deflected by the light deflector 24, so that the radiation image which was stored on the stimulable phosphor sheet 1 is reproduced as a photographic latent image on the recording sheet 4.

After the image has been reproduced on the recording sheet 4 in the light beam scanning section 20, the recording sheet 4 is conveyed by the sheet conveyance means 50 in the directions indicated by the arrows B5 and B6 into the automatic developing section 70. At this time, the distribution means 52 moves to the position indicated by the broken line in FIG. 1 and guides the recording sheet 4 to the automatic developing section 70. In the illustrated radiation image read-out and reproducing apparatus, the cassette holding section 10, the magazine holding section 40, the recording sheet feeding section 60, the light beam scanning section 20, the erasing section 30 and the sheet conveyance means 50 are accommodated in a single case 7. Also, the automatic developing section 70 is combined with the side of the case 7.

At the automatic developing section 70, the recording sheet 4 is developed by being sent sequentially through a developing zone 71, a fixing zone 72, a washing zone 73 and a drying zone 74, and is then housed in the tray 75.

The illustrated radiation image read-out and reproducing apparatus is provided with the magazine holding section 40 described above so that the image readout can be carried out also for the stimulable phosphor sheets 1, 1, ... housed in the stimulable phosphor sheet magazine 3. Specifically, the magazine holding section 40 is provided with a sheet take-out means 41 constituted of an air suction cup or the like for taking the stimulable phosphor sheets 1, 1, ... one by one from the stimulable phosphor sheet magazine 3. A stimulable phosphor sheet 1, which has been taken out of the stimulable phosphor sheet magazine 3, is fed to the part of the sheet conveyance means 50 close to the magazine holding section 40. The stimulable phosphor sheet 1 is conveyed in the direction indicated by the arrow C1 and is then conveyed in the directions indicated by the arrows C2 through C7 to the light beam scanning section 20 and the erasing section 30. The stimulable phosphor sheet 1 is subjected to image readout and erasing in the same manner as a stimulable phosphor sheet 1 fed out of the cassette 2. The stimulable phosphor sheet 1 is then conveyed in the directions indicated by the arrows C8 and C9, conveyed in the opposite direction indicated by the arrow C10, guided by the distribution means 53 which has moved to the position indicated by the broken line, and conveyed into the tray 6 at the tray holding section 80.

Figure 2:
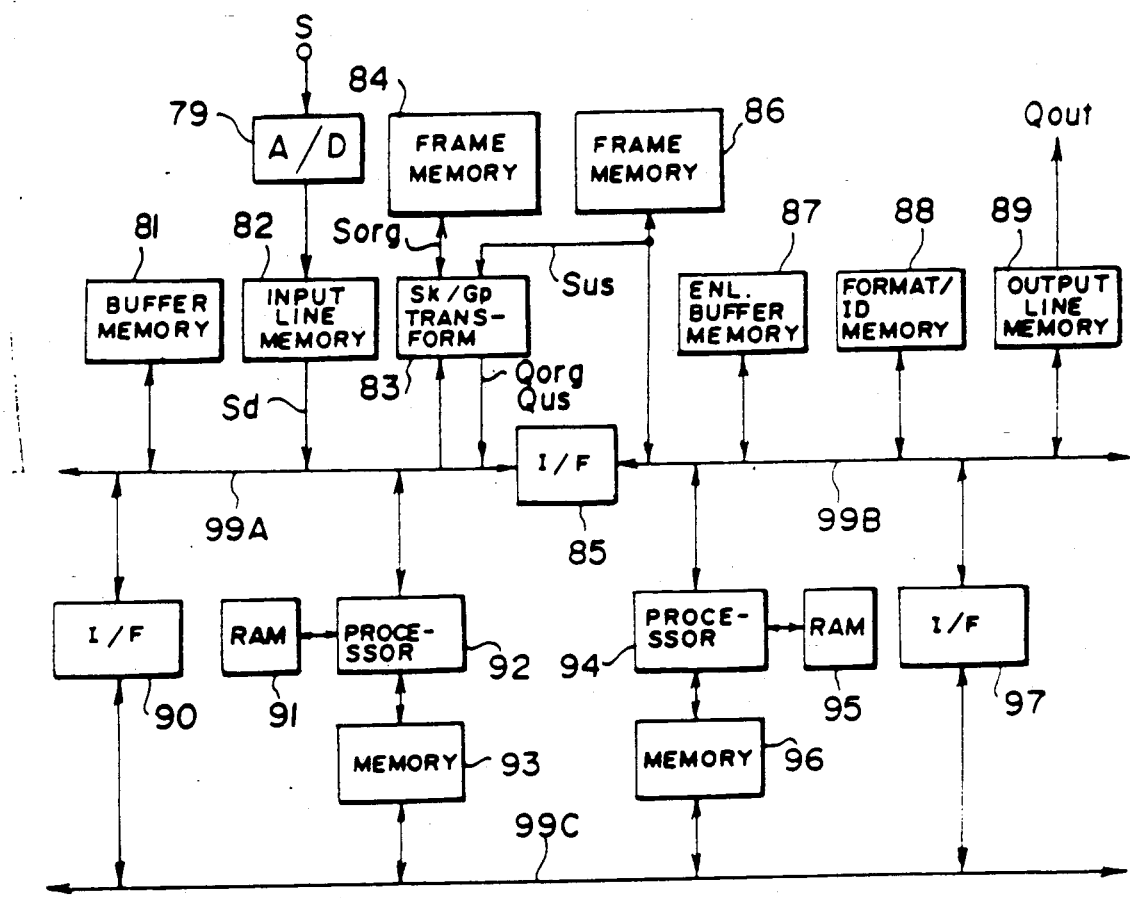
FIG. 2 is a block diagram showing an image processing circuit in the radiation image read-out and reproducing apparatus of FIG. 1.
Figure 3:
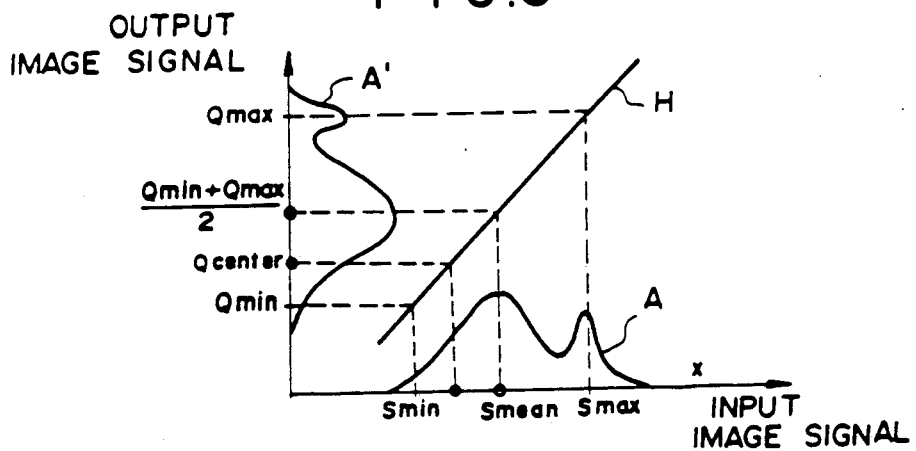
FIG. 3 is a graph demonstrating transformation processing carried out to correct read-out gain and transformation processing carried out to determine latitude.

Image processing will be described hereinbelow. FIG. 2 shows an image processing circuit in the image information processing circuit 27. With reference to FIG. 2, a buffer memory 81, an input line memory 82, and an Sk/Gp transformation microprocessor 83 are connected to a bus 99A. An original signal frame memory 84 is connected to the Sk/Gp transformation microprocessor 83. The bus 99A is connected to a bus 99B via an interface 85. An unsharp mask signal frame memory 86, an enlargement buffer memory 87, a format/ID memory 88 which stores the formats of reproduced images and ID information about objects, and an output line memory 89 are connected to the bus 99B. Also, a high order MPU interface 90 and a microprocessor 92 are connected to the bus 99A. (MPU is an acronym for a microprocessor unit.) A processor memory 93, which operates the microprocessor 92, and the high order MPU interface 90 are connected to a high order MPU bus 99C. A high order MPU interface 97 and a microprocessor 94 are connected to the bus 99B. A processor memory 96, which operates the microprocessor 94, and the high order MPU interface 97 are connected to the high order MPU bus 99C. High-speed RAM's 91 and 95, which temporarily store a signal which is being processed, are respectively connected to the microprocessors 92 and 94. Microprocessor 92 is controlled by a high order MPU (not shown), which also controls the radiation image read-out operation and the reproducing operation via the bus 99C and the interface 90. Also, microprocessor 94 is controlled by said high order MPU via the bus 99C and the interface 97.

When a radiation image is being read out from a stimulable phosphor sheet 1 in the light beam scanning section 20, an analog read-out image signal S obtained from the read-out operation is digitized by an A/D converter 79, and the digital read-out image signal thus obtained is fed into the input line memory 82. The input line memory 82 feeds out a digital read-out image signal Sd representing the image information at each of main scanning lines. In accordance with predetermined programs which are stored in the processor memory 93, the microprocessor 92 calculates characteristic values Sk and Gp from the digital read-out image signal Sd, creates a transformation table on the basis of the characteristic values Sk and Gp, and carries out RI removal processing. RI removal processing is proposed in, for example, U.S. Pat. Appln. Ser. No. 179,821 and is carried out to remove noise components from the digital read-out image signal Sd. The noise components cause black dots to arise in a reproduced visible image. The digital read-out image signal Sd, obtained after the RI removal processing is carried out, is temporarily stored in the buffer memory 81. Ultimately, a signal which represents a single image and which has thus been processed is stored as an original image signal Sorg in the original signal frame memory 84.

Figure 5:
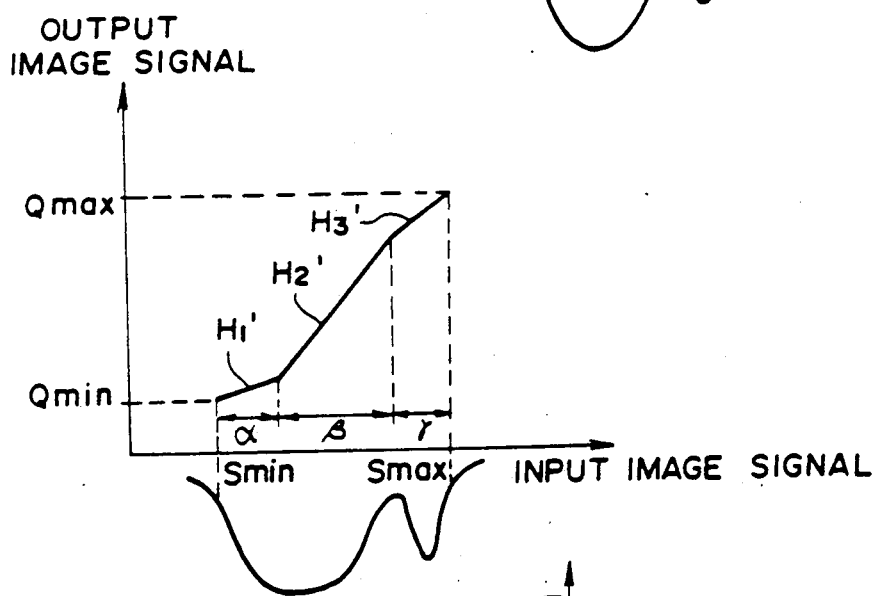

The microprocessor 92 creates the table which is used to carry out transformation processing of the image signal in accordance with transformation characteristics. For example, transformation straight lines H1', H2', and H3' shown in FIG. 5 represent transformation characteristics and are based on the characteristic values Sk and Gp. By way of example, for the transformation straight line H1', the transformation characteristics are expressed as $$Q = ka1 \cdot S + ka2 \qquad (2)$$

where ka1 and ka2 are fixed numbers. As for the transformation straight line H2', the transformation characteristics are expressed as $$Q = kb1 \cdot S + kb2 \qquad (3)$$

where kb1 and kb2 are fixed numbers. As for the transformation straight line H3', the transformation characteristics are expressed as $$Q = kc1 \cdot S + kc2 \qquad (4)$$

where kc1 and kc2 are fixed numbers. The table is developed digitally and is stored in the buffer memory 81.

On the other hand, during the read-out operation, the microprocessor 94 receives the digital read-out image signal Sd representing the image information at each of the main scanning lines, and carries out processing to obtain an unsharp mask signal Sus. By way of example, the unsharp mask signal Sus represents the mean value of the image signal components corresponding to picture elements located in a mask having a specific size. When the size of the mask is NxN, $Sus = \Sigma S/N^2$. The unsharp mask signal Sus is stored in the unsharp mask signal frame memory 86.

The processing for calculating the characteristic values Sk and Gp, the processing for creating the transformation table, the processing for removing the noise components, and the processing for obtaining an unsharp mask signal are carried out during the time from when the read-out operation is being carried out to when the radiation image reproducing operation is begun.

When a radiation image is reproduced in the light beam scanning section 20 in the manner described above, the Sk/Gp transformation microprocessor 83 reads the original image signal Sorg and the unsharp mask signal Sus respectively stored in the original signal frame memory 84 and the unsharp mask signal frame memory 86. In accordance with the transformation table stored in the buffer memory 81, the Sk/Gp transformation microprocessor 83 uses Formulas (2), (3), and (4) to transform the original image signal Sorg and the unsharp mask signal Sus. Specifically, the image signal components of the original image signal Sorg corresponding to the division α (shown in FIG. 5) have a relatively low density and are transformed to an image signal Qorg expressed as $$Qorg = ka1 \cdot Sorg + ka2$$

where ka1 and ka2 are fixed numbers. The image signal components of the original image signal Sorg corresponding to the division β (shown in FIG. 5) have a medium density and are transformed to an image signal Qorg expressed as $$Qorg = kb1 \, Sorg + kb2$$

where kb1 and kb2 are fixed numbers. The image signal components of the original image signal Sorg corresponding to the division γ (shown in FIG. 5) have a relatively high density and are transformed to an image signal Qorg expressed as $$Qorg = kc1 \cdot Sorg + kc2$$

where kc1 and kc2 are fixed numbers. Because transformation processing is thus carried out on the basis of the characteristic values Sk and Gp, the transformed image signal Qorg results in a reproduced visible image having a desirable image density range, and the latitude is optimized. Also, the unsharp mask signal Sus is transformed in the same manner. Specifically, as for the division α, the unsharp mask signal Sus is transformed to a signal Qus expressed as $$Qus = ka1 \cdot Sus + ka2$$

where ka1 and ka2 are fixed numbers. As for the division β, the unsharp mask signal Sus is transformed to a signal Qus expressed as $$Qus = kb1 \cdot Sus + kb2$$

where kb1 and kb2 are fixed numbers. As for the division γ, the unsharp mask signal Sus is transformed to a signal Qus expressed as $$Qus = kc1 \cdot Sus + kc2$$

where kc1 and kc2 are fixed numbers.

The transformation table should preferably be constituted so that the original image signal Sorg or the unsharp mask signal Sus is fed directly to an entry part and the transformed image signal Qorg or the transformed unsharp mask signal Qus is directly output. Such a configuration shortens the time required to complete the transformation processing.

Components of the transformed image signal Qorg and components of the transformed unsharp mask signal Qus, which components correspond to each of main scanning lines, are sequentially fed out of the Sk/Gp transformation microprocessor 83. The microprocessor 92 receives the transformed image signal Qorg and the transformed unsharp mask signal Qus and carries out frequency response processing and gradation processing on the transformed image signal Qorg. Frequency response processing may be carried out in the manner disclosed in, for example, Japanese Unexamined Patent Publication No. 56(1981)-138735. Specifically, processing expressed as $$Qorg + \beta(Qorg - Qus)$$

where β denotes a frequency emphasis coefficient is carried out in order to emphasize frequency components above a super-low frequency. The microprocessor 92 carries out frequency response processing and gradation processing with a single process. Specifically, the transformed image signal Qorg is converted into a processed image signal Qout expressed as $$Qout = \gamma \{Qorg + \beta(Qus)\}$$

where γ denotes a gradation correction coefficient. As a result of the frequency response processing described above, super-low frequency components are emphasized, and high frequency components, which include a high degree of noise, are reduced. Therefore, a reproduced visible image can be obtained which can be easily viewed. Gradation processing is disclosed in, for example, U.S. Pat. No. 4,394,737. Gradation processing optimizes the gradation of the reproduced visible image.

Components of the processed image signal Qout corresponding to each of the main scanning lines are temporarily stored in the output line memory 89 and fed out of the image information processing circuit 27. The processed image signal Qout controls the light modulator 26 in the light beam scanning section 20. The light modulator 26 modulates the laser beam 21 in accordance with the processed image signal Qout, and the recording sheet 4 is scanned with the modulated laser beam 21. In this manner, the radiation image, which the processed image signal Qout represents, is reproduced on the recording sheet 4.

In order for the visible radiation image, which is reproduced from the processed image signal Qout, to have a good enough image quality that it can serve as an effective tool in, for example, the efficient and accurate diagnosis of an illness, the density resolution of the reproduced visible image should preferably not be lower than 10 bits (=1,024 levels). In cases where the density resolution is 10 bits, the transformed image signal Qorg and the transformed unsharp mask signal Qus, which are subjected to frequency response processing and gradation processing, should preferably have a resolution of not lower than 11 bits. When the resolutions of the transformed image signal Qorg and the transformed unsharp mask signal Qus are not lower than 11 bits, it is possible to prevent the problem of a sharp change in image density being caused to arise in the reproduced visible image (particularly, in cases of tomographic images of a human body) by a decrease in the number of digits in the calculations made during frequency response processing and gradation processing.

When necessary, before the processed image signal Qout is fed to the output line memory 89, it is subjected to enlargement processing in the microprocessor 94. Enlargement processing is carried out in order to, for example, interpolate values from the processed image signal Qout while it is temporarily stored in the buffer memory 87, thereby to "thicken" the processed image signal Qout. An image signal obtained from enlargement processing is used to reproduce an enlarged visible image. Conversely, the processed image signal Qout may be "thinned" in order to reproduce a reduced visible image.

Figure 4:
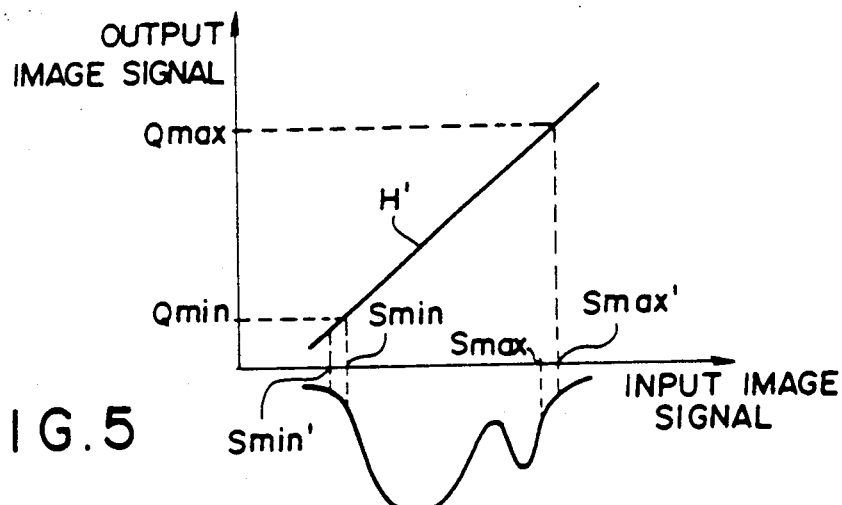
FIGS. 4, 5 and 6 are graphs showing examples of transformation characteristics employed during transformation processing carried out to correct read-out gain and transformation processing carried out to determine latitude.
Figure 6:
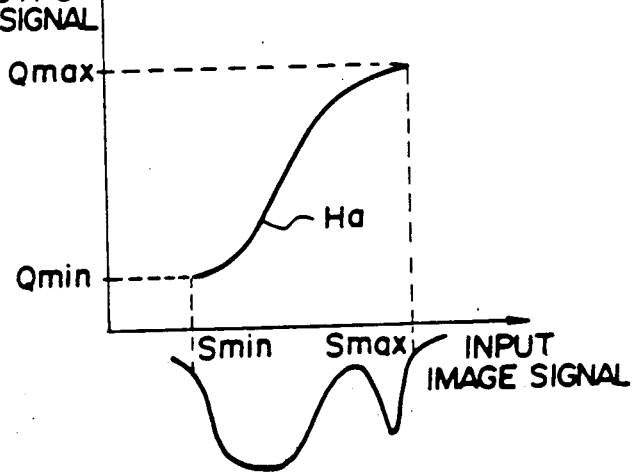

In the embodiment described above, transformation processing is carried out on the basis of a plurality of simple equations applied to components of the original image signal Sorg whose values fall within specified ranges. Alternatively, as shown in FIG. 4, transformation processing may be carried out on the basis of a single simple equation applied to all components of the original image signal Sorg. Also, as shown in FIG. 6, transformation processing may be carried out on the basis of a transformation curve, i.e. on the basis of an equation of second or higher order.

Also, in the aforesaid embodiment, transformation processing for correcting the read-out gain and the scale factor is carried out on the digital read-out image signal Sd. Alternatively, transformation processing may be carried out on the analog read-out image signal S.

We claim:

1. A radiation image processing method for use in a radiation image read-out and reproducing system wherein a read-out operation is carried out in which a stimulable phosphor sheet, having a radiation image stored thereon, is exposed to stimulating rays, which cause the stimulable phosphor sheet to emit light in proportion to an amount of energy stored thereon during exposure to radiation, and wherein the emitted light is photoelectrically detected and a read-out image signal which represents the radiation image is thereby obtained, said read-out image signal being made up of a series of components and being used to reproduce the radiation image as a visible image, the radiation image processing method comprising the steps of:
i) calculating characteristic values from said read-out image signal, which are used during processing to extract only those image signal components which are related to a diagnosis or the like from said read-out image signal,
ii) carrying out image signal normalizing transformation processing on said read-out image signal, wherein said characteristic values control said transformation processing in order to correct a read-out gain and/or a scale factor, and
iii) using a visible image signal generated by said image signal normalizing transformation processing, which is carried out upon said read-out image signal, thereby reproducing the radiation image as a visible image.

2. A method as defined in claim 1 wherein transformation processing is carried out on the basis of a single simple equation applied over an entire range of values of said read-out image signal.

3. A method as defined in claim 1 wherein transformation processing is carried out on the basis of a plurality of simple equations each applied over different ranges of values of said read-out image signal.

4. A method as defined in claim 1 wherein transformation processing is carried out on the basis of an equation of second or higher order applied over an entire range of values of said read-out image signal.

5. A radiation image processing method for use in a radiation image read-out and reproducing system wherein a read-out operation is carried out in which a stimulable phosphor sheet, having a radiation image stored thereon, is exposed to stimulating rays, which cause the stimulable phosphor sheet to emit light in proportion to an amount of energy stored thereon during exposure to radiation, and wherein the emitted light is photoelectrically detected and an analog read-out image signal which represents the radiation image is thereby obtained, said read-out image signal thereafter being used to reproduce the radiation image as a visible image,
the radiation image processing method comprising the steps of:
i) digitizing said read-out image signal so that said read-out image signal is made up of a series of components,
ii) calculating characteristic values from the digitized read-out image signal, which are used during processing to extract only those image signal components which are related to a diagnosis or the like from the digital image signal,
iii) creating a table, which is to be used when said digital image signal undergoes transformation processing, wherein values stored in said table are fixed numbers based on said characteristic values,
iv) carrying out transformation processing on said digital image signal in accordance with said fixed numbers from said table, and
v) using a visible image signal, generated from said transformation processing, which has been carried out on said digital image signal, in order to reproduce the radiation image as a visible image.

6. A method as defined in claim 5 wherein transformation processing is carried out on the basis of a single simple equation applied over an entire range of values of said digital image signal, wherein said simple equation uses corresponding fixed numbers from said table.

7. A method as defined in claim 5 wherein transformation processing is carried out on the basis of a plurality of simple equations each applied over different ranges of values of said digital image signal, wherein each of said plurality of simple equations uses corresponding fixed number from said table.

8. A method as defined in claim 5 wherein transformation processing is carried out on the basis of an equation of second or higher order applied over an entire range of values of said digital image signal, wherein said equation uses corresponding fixed numbers from said table.

9. A radiation image processing method for use in a radiation image read-out and reproducing system wherein a read-out operation is carried out in which a stimulable phosphor sheet, having a radiation image stored thereon, is exposed to stimulating rays, which cause the stimulable phosphor sheet to emit light in proportion to an amount of energy stored thereon during exposure to radiation, and wherein the emitted light is photoelectrically detected and a read-out image signal which represents the radiation image is thereby obtained, said read-out image signal being made up of a series of components and being used to reproduce the radiation image as a visible image,
the radiation image processing method comprising the steps of:
i) calculating characteristic values from said read-out image signal, which are used during processing to extract only those image signal components which are related to a diagnosis or the like from said read-out image signal,
ii) carrying out image signal normalizing transformation processing on said read-out image signal, wherein said transformation processing is based upon an equation of second or higher order, said equation being determined by said characteristic values, in order to correct a read-out gain and/or a scale factor, and
iii) using a visible image signal generated by said image signal normalizing transformation processing, which is carried out upon said read-out image signal, thereby reproducing the radiation image as a visible image.

* * * * *